(12) United States Patent
Okazaki et al.

(10) Patent No.: US 7,510,245 B2
(45) Date of Patent: Mar. 31, 2009

(54) SEAT BELT WEBBING ENCLOSURE

(75) Inventors: Hidetsugu Okazaki, Dublin, OH (US); Kelly Michael Whalen, Worthington, OH (US)

(73) Assignee: Honda Motor Co., Ltd, Tokyo (JP)

( * ) Notice: Subject to any disclaimer, the term of this patent is extended or adjusted under 35 U.S.C. 154(b) by 161 days.

(21) Appl. No.: 11/456,988

(22) Filed: Jul. 12, 2006

(65) Prior Publication Data

US 2008/0012417 A1 Jan. 17, 2008

(51) Int. Cl.
*A47D 15/00* (2006.01)

(52) U.S. Cl. .................. 297/483; 297/481; 297/484; 297/452.18; 297/452.38; 297/218.1; 297/218.3; 297/218.5; 297/182

(58) Field of Classification Search .............. 297/484, 297/452.38, 481, 218.1, 218.3, 218.5, 182
See application file for complete search history.

(56) References Cited

U.S. PATENT DOCUMENTS

| | | | |
|---|---|---|---|
| 3,637,258 A | 1/1972 | Bayon | |
| 3,663,057 A | 5/1972 | Lohr et al. | |
| 3,877,748 A | 4/1975 | Eggert | |
| 5,246,271 A | 9/1993 | Boisset | |
| 5,390,982 A | 2/1995 | Johnson et al. | |
| 5,452,941 A | 9/1995 | Halse et al. | |
| 5,599,070 A * | 2/1997 | Pham et al. | 297/483 |
| 5,879,055 A | 3/1999 | Dishner et al. | |
| 5,895,090 A | 4/1999 | Farquhar et al. | |
| 5,918,943 A | 7/1999 | Mitschelen et al. | |
| 6,048,034 A | 4/2000 | Aumont et al. | |
| 6,394,542 B2 * | 5/2002 | Potisch et al. | 297/182 |
| 6,428,106 B1 * | 8/2002 | Andersson | 297/483 |
| 6,533,320 B1 | 3/2003 | Langensiepen et al. | |
| 6,543,843 B1 * | 4/2003 | Moilanen | 297/218.5 |
| 6,655,745 B2 | 12/2003 | Fohrenkamm et al. | |
| 6,767,055 B1 | 7/2004 | Sparks | |
| 2004/0155499 A1 * | 8/2004 | Chambers et al. | 297/228.1 |
| 2005/0110328 A1 | 5/2005 | Kennedy, Sr. | |
| 2005/0151406 A1 * | 7/2005 | Hale | 297/330 |

* cited by examiner

*Primary Examiner*—Katherine W Mitchell
*Assistant Examiner*—Philip S Kwon
(74) *Attorney, Agent, or Firm*—Mark Duell; Michael A. Forhan; Eley Law Firm Co.

(57) ABSTRACT

A seat belt webbing enclosure for a vehicle seat having a seat back and a seat cushion. The enclosure includes a bracket attached to a frame of the seat back. A cover is coupled to the bracket and extends downwardly to the seat cushion to enclose a gap between the seat back the seat cushion. A seat belt web of the seat is substantially enclosed proximate the gap by the cover in cooperation with the seat cushion.

9 Claims, 10 Drawing Sheets

SEAT BELT WEBBING ENCLOSURE

FIELD OF THE INVENTION

The present invention relates generally to seat belts in vehicles, in particular to an enclosure that conceals and protects a seat belt web.

BACKGROUND

Vehicles typically include seat belts to help restrain occupants in the event of a sudden stop or accident. In some vehicles the seat belts are anchored to the frame independently of the seat such that forces exerted upon the belt by an occupant are transferred directly to the frame. In such configurations the seat can be relatively light-weight, since the seat is not required to function as an occupant restraint. Unfortunately, these designs can be impractical for use with adjustable seats, which can be moved forward and backward and reclined, as the seat belts must be likewise adjustable for the various seating positions while retaining their intended safety features. Seats with separately anchored restraint systems are also more difficult to incorporate into the cabins of a wide variety of vehicle types, as the floor and wall structures of the vehicle may not readily accommodate the necessary frame anchor points for lap and shoulder belts.

To overcome the aforementioned limitations of separately anchored seat belts vehicle designers are increasingly turning to configurations wherein the seat belts are integrated with the vehicle seats. In such configurations the seat belts are anchored to the seat frame which is in turn anchored to the vehicle frame. Accordingly, the seat belts can be located more optimally to accommodate variations in seat position and orientation. These configurations also have an advantage in that the seat assembly, together with the seat belt, can be installed as a single unit in the passenger compartment at the time of vehicle manufacture.

One important consideration when the safety restraint belt is integrated with the seat assembly is that the seat assembly must be designed to allow unrestricted movement of the seat belt webbing as it is extended and retracted so that the inertia reel retractor can function properly without causing discomfort to the occupants. Similarly, the seat belt webbing should be protected against abrasion or wear that could weaken the webbing. In addition, the seat assembly should protect the webbing against binding or damage caused by passengers and/or objects coming into contact with the seat belt.

Current integrated seat restraint systems often locate the seat belt retractor on the seat's frame, beneath the seat cushion, and route the seat belt webbing upwardly along a rear portion of the seat back. In these designs the portion of the path of the seat belt webbing, generally between the seat cushion and the seat back, may be exposed. Ideally this exposed region would be enclosed to protect the seat belt webbing potential restriction, wear and damage caused by occupants and/or objects coming into contact with it. However, enclosing the exposed region is problematic because doing so can hinder the range of motion of the seat back.

There is a need for a way to protect a vehicle seat belt web as it passes between a seat cushion and a seat back without hindering the range of motion of the seat back or impeding the operation of the seat belt.

SUMMARY

A vehicle seat belt webbing enclosure is disclosed according to an embodiment to the present invention. The enclosure protects the seat belt webbing in the region between the seat cushion and the seat back, thereby resisting damage to the seat belt webbing by occupants and/or objects in the vehicle. The present invention also improves the overall appearance of the seat restraint system by providing a finished surface.

An aspect of the present invention is a seat belt webbing enclosure for a vehicle seat having a seat back and a seat cushion. The enclosure includes a bracket attached to a frame of the seat back. A cover is coupled to the bracket and extends downwardly to the seat cushion to enclose a gap between the seat back the seat cushion. A seat belt web of the seat is substantially enclosed proximate the gap by the cover in cooperation with the seat cushion.

Another aspect of the present invention is a method for enclosing a seat belt webbing of a vehicle seat having a seat back and a seat cushion. The method includes the steps of attaching a bracket to a frame of the seat back, and coupling a cover to the bracket such that the cover extends downwardly to the seat cushion, substantially enclosing a gap between the seat back the seat cushion. The seat belt web is substantially enclosed proximate the gap by the cover in cooperation with the seat cushion.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
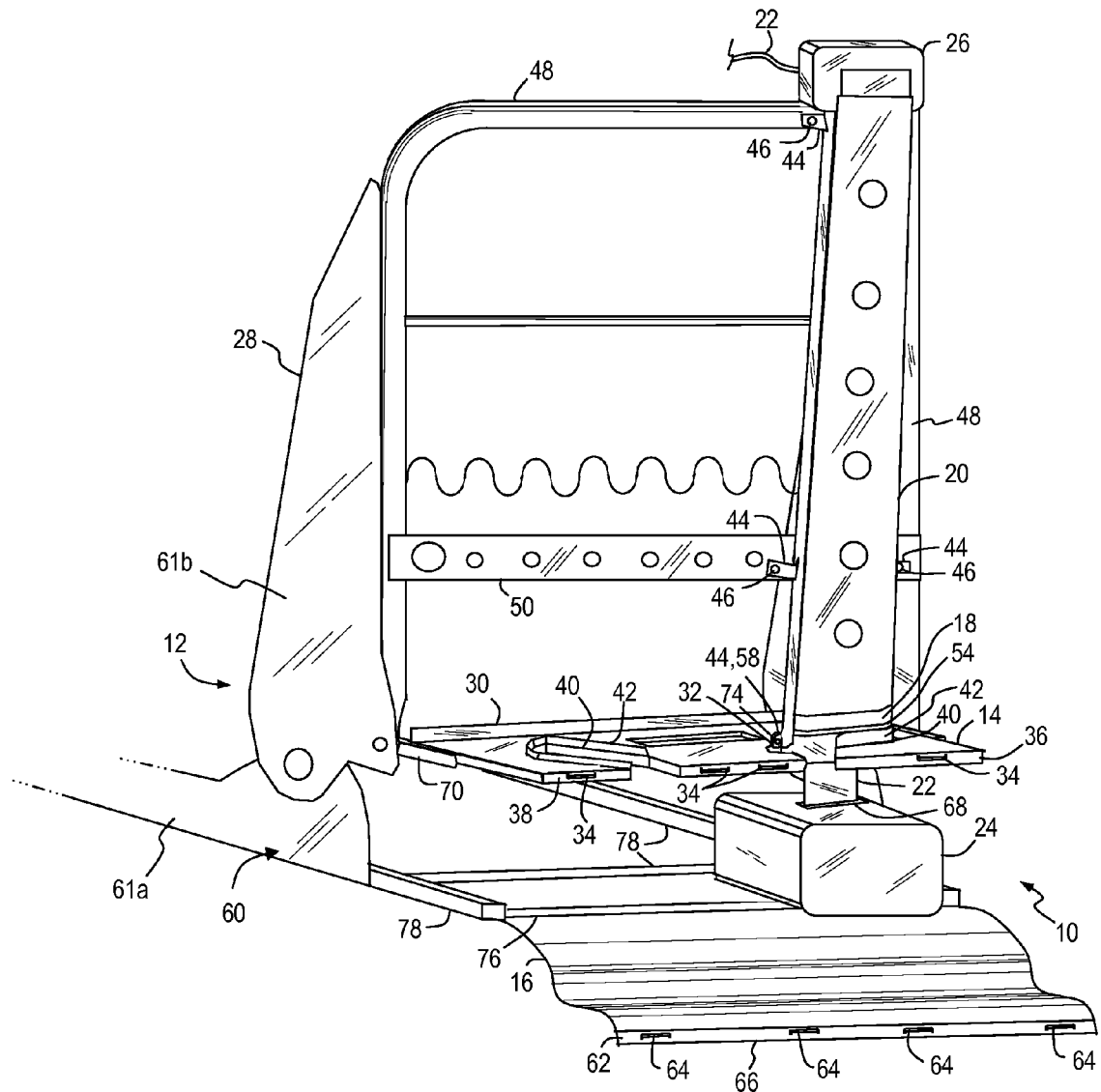
FIG. 1 is a perspective view depicting the general arrangement of a seat belt webbing enclosure according to an embodiment of the present invention.

In the discussion that follows, like reference numerals are used to represent elements of like structure and function in the figures.

The general arrangement of a seat belt webbing enclosure 10 for a vehicle seat 12 is shown in FIG. 1 according to an embodiment of the present invention. Enclosure 10 comprises a bracket 14, a cover 16, a web guide 18 and a sheath 20. A seat belt web 22 exits a retractor 24 and is routed through, in order, bracket 14, web guide 18 and sheath 20, exiting seat 12 forwardly through an outlet housing 26.

Seat belt retractor 24 is mounted to a frame 28 of seat 12 and retractably houses webbing 22. Retractor 24 may include an inertia reel mechanism (not shown) configured to allow a user to selectably extend and retract webbing 22 during normal use of the safety restraint system. The inertia reel mechanism is further configured to resist extension of the webbing 22 in the event of a sudden stop or accident, thereby restraining an occupant of seat 12. The present invention may be advantageously used with any conventional type of seat belt webbing 22 and retractor 24 commonly employed in vehicle seats 12 having integrated passenger restraint systems. Accordingly, these components will not be detailed further herein.

Figure 2A:
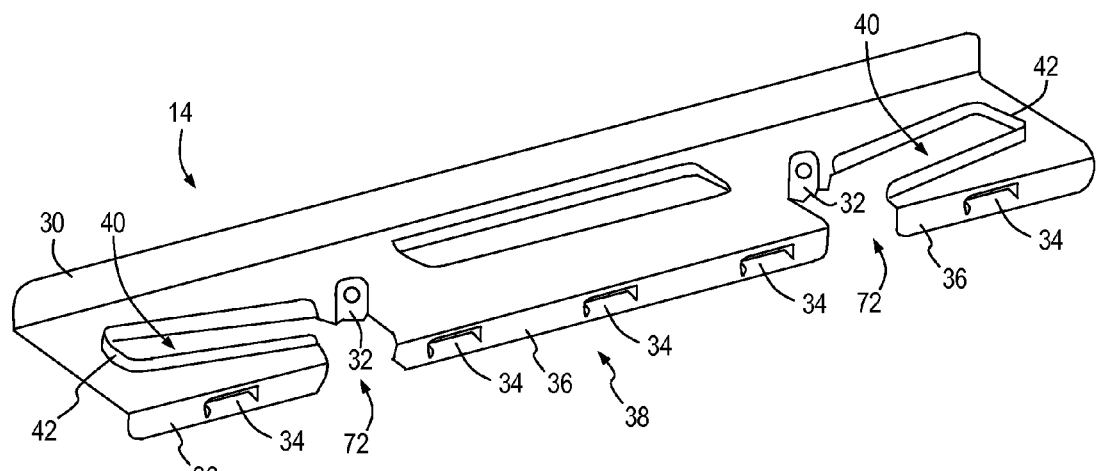
FIG. 2A depicts a bracket according to an embodiment of the present invention.
Figure 2B:
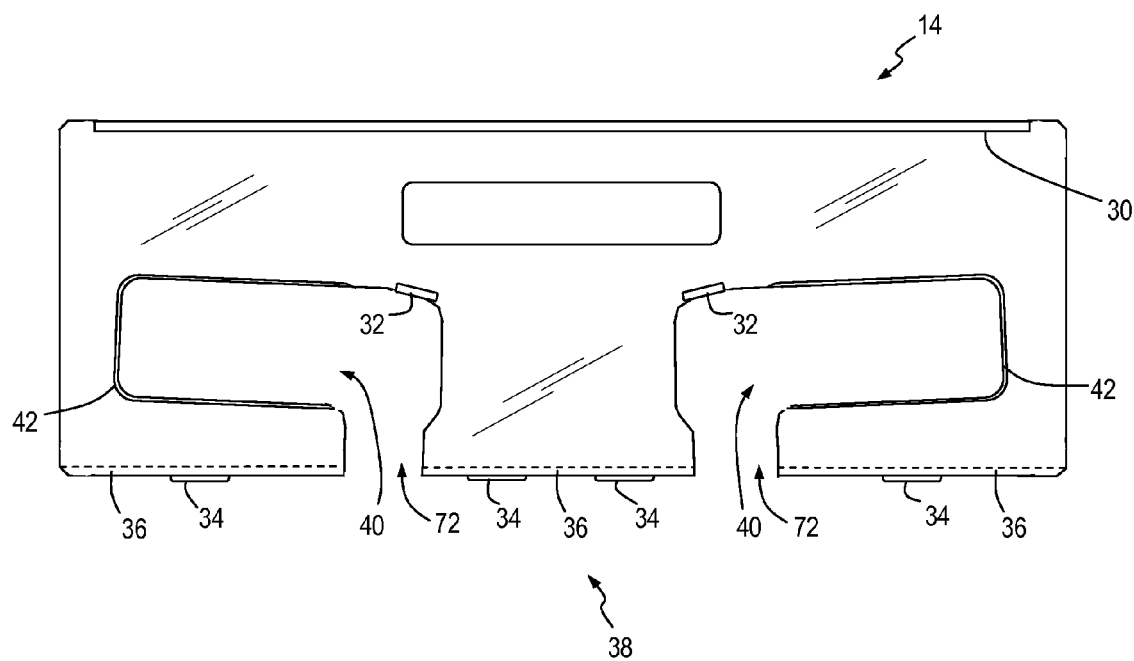
FIG. 2B is a top plan view of a bracket according to an embodiment of the present invention.
Figure 3:
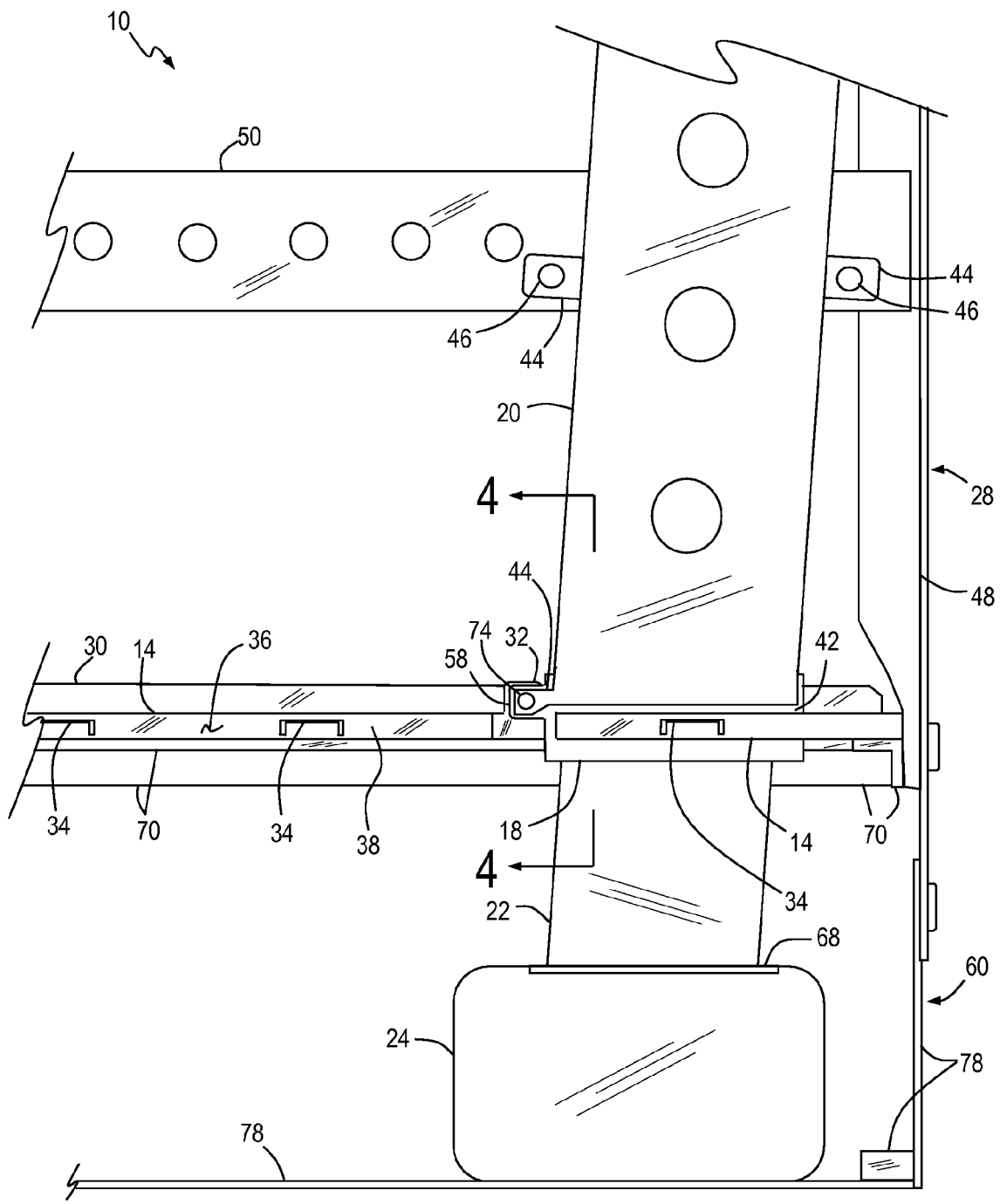
FIG. 3 is expanded view showing details of the seat belt webbing enclosure of FIG. 1.
Figure 4:
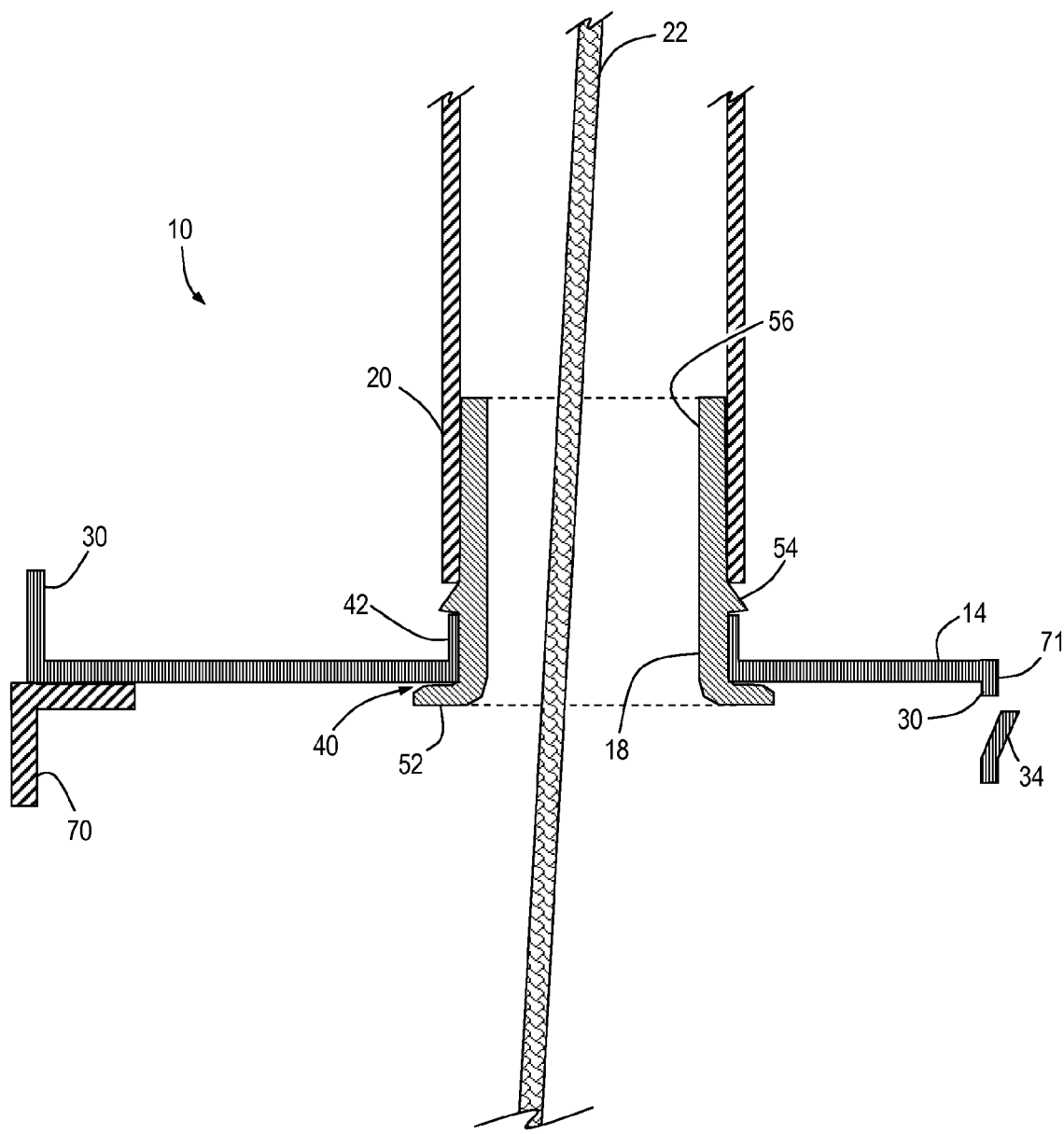
FIG. 4 is a view in section showing the assembly of a bracket, web guide, belt sheath and seat belt webbing according to an embodiment of the present invention.
Figure 5:
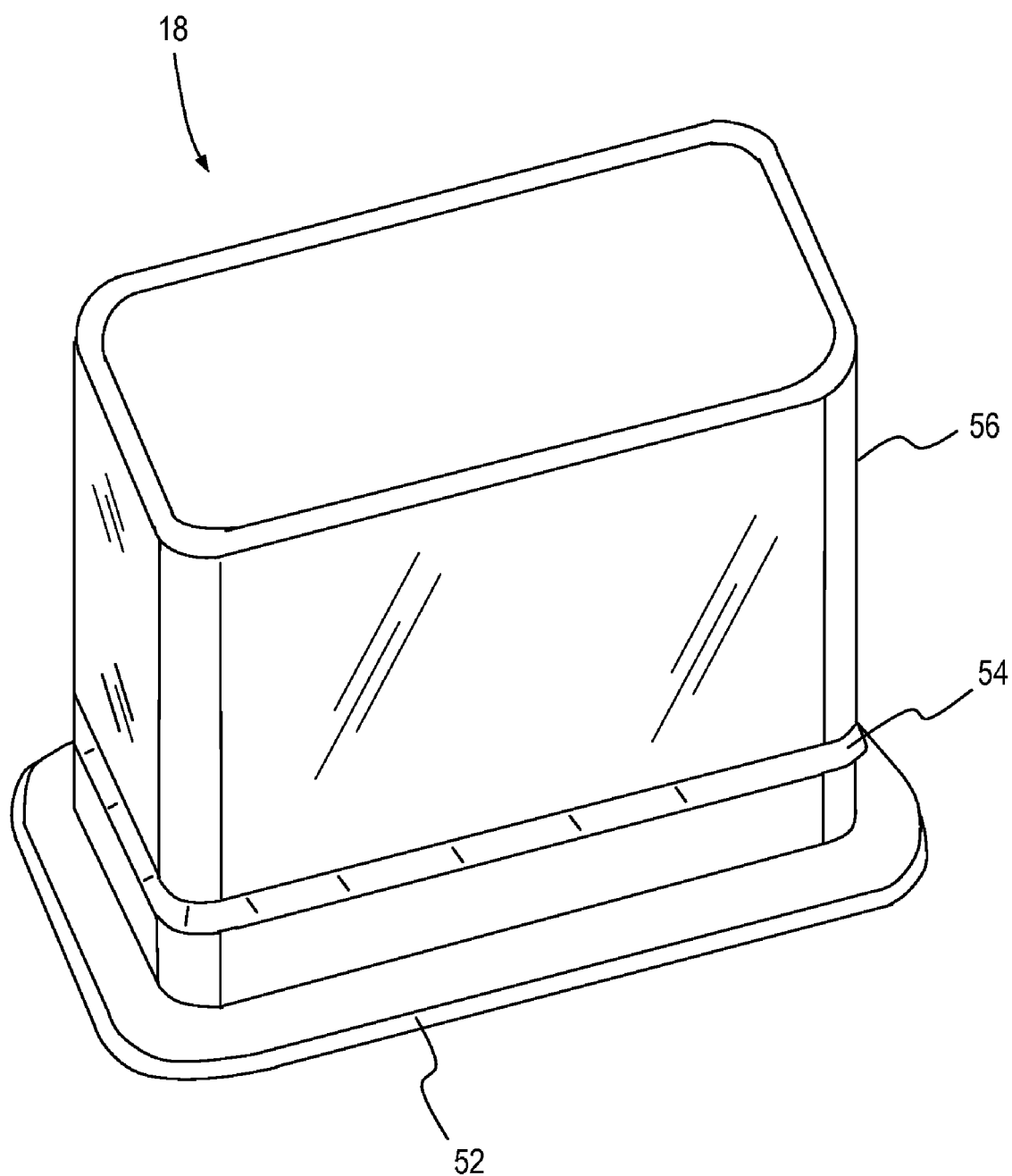
FIG. 5 shows a seat belt guide according to an embodiment of the present invention.

With reference now to FIGS. 2A, 2B and 3 in combination with FIG. 1, bracket 14 is generally rectangular in shape and is oriented generally horizontally, extending substantially across the width of a seat back 28 of vehicle seat 12 and projecting outwardly, generally perpendicular from the rear of the seat back. Bracket 14 may include one or more reinforcing flanges 30 along its edges, extending at a generally right angle upward or downward with respect to the plane of the bracket. Bracket 14 further includes at least one mounting tab 32. A plurality of fasteners 34 such as, without limitation, J-clips, tabs, VELCRO, snaps and clips are attached to or integrated with a mounting flange 36 of a rearward edge 38 of the bracket 14.

With continuing reference to FIGS. 2A, 2B and 3, the planar surface of bracket 14 further includes one or more generally L-shaped apertures 40. Apertures 40 may include one or more coupling flanges 42 along a portion or all of the perimeter of the apertures, extending upwardly or downwardly at generally right angles to the plane of bracket 14. A pair of spaced-apart apertures 40 may be included to provide adaptability of the bracket to either a driver or passenger side vehicle seat wherein the location of the seat belt would typically be located on the left and right sides, respectively, of the seat. Alternatively, a single aperture 40 may be formed in bracket 14. In one embodiment (not shown) a single aperture 40 is located on the planar surface of bracket 14 such that the aperture is in the desired location for either a driver or passenger side vehicle seat, the bracket being non-inverted for either a driver- or passenger-side seat and inverted for the opposing seat.

Bracket 14 may be made from any suitable material compatible with other components of seat 12 and the expected environment. Example materials include, without limitation, metals such as steel and aluminum, plastics, and composites. Bracket 14 may be fabricated using any conventional process such as, without limitation, molding, stamping, casting and machining. Bracket 14 may be finished by such processes as painting, plating and coating, or left unfinished.

With reference to FIGS. 1-4 in combination, sheath 20 is a generally hollow column with a generally rectangular cross-section that is sized to enclose and guide seat belt webbing 22 without impeding the webbing's travel through the sheath. Sheath 20 generally encloses and protects webbing 22 as it passes between bracket 14 and belt outlet housing 26, as depicted by FIG. 1. Sheath 20 may also include one or more mounting tabs 44. Sheath 20 may be made from any suitable material compatible with other components of seat 12 and the expected environment. Example materials include, but are not limited to, metals, such as steel and aluminum, plastics, and composites. Sheath 20 may be fabricated using any conventional process such as, without limitation, molding, stamping, casting and machining. Sheath 20 may be finished by such processes as painting, plating and coating, or left unfinished.

With reference to FIGS. 1, 3, 4 and 5 together, a web guide 18 may be fitted between bracket 14 and sheath 20 to provide a binding-resistant path between retractor 24 and the sheath. Web guide 18 is generally rectangular and shaped to fit into a selected aperture 40 and includes a flanged portion 52 configured to engage and generally close off the aperture. Web guide 18 is coupled to coupling flange 42 of bracket 14 and retained thereto by a locking rib or lip 54 of the web guide. An elongated portion 56 of web guide 18 is shaped to fit into, and extend into, sheath 20. Web guide 18 further includes at least one mounting tab 58. Web guide 18 may be made from any suitable material compatible with other components of seat 12 and the expected environment. Example materials include, without limitation, metals, such as steel and aluminum, plastics, and composites. Web guide 18 may be fabricated using any conventional process such as, without limitation, molding, stamping, casting and machining. Web guide 18 may be finished by such processes as painting, plating and coating, or left unfinished.

Figure 6:
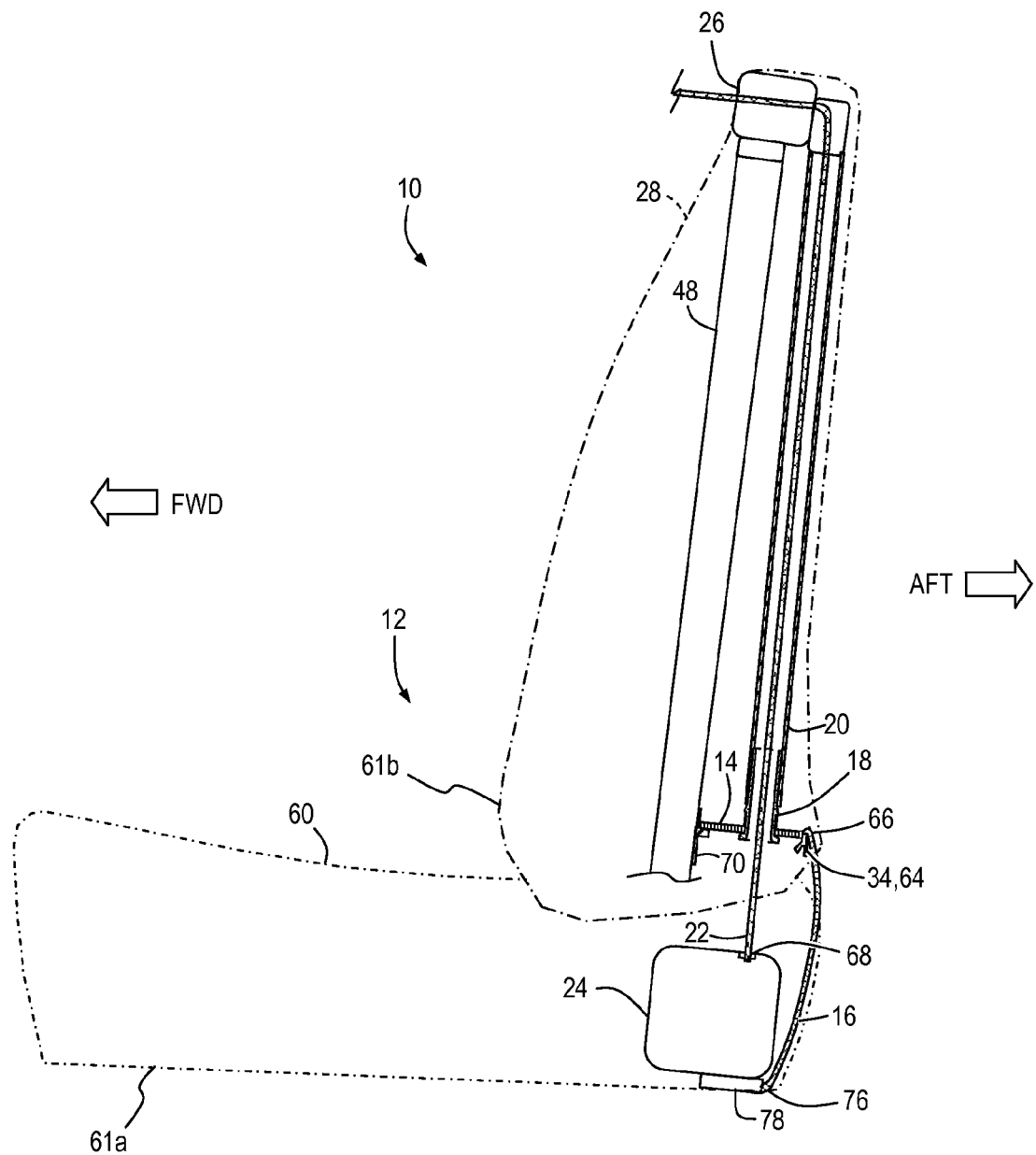
FIG. 6 is a cutaway view of a seat belt webbing enclosure installed within a vehicle seat according to an embodiment of the present invention.
Figure 7:
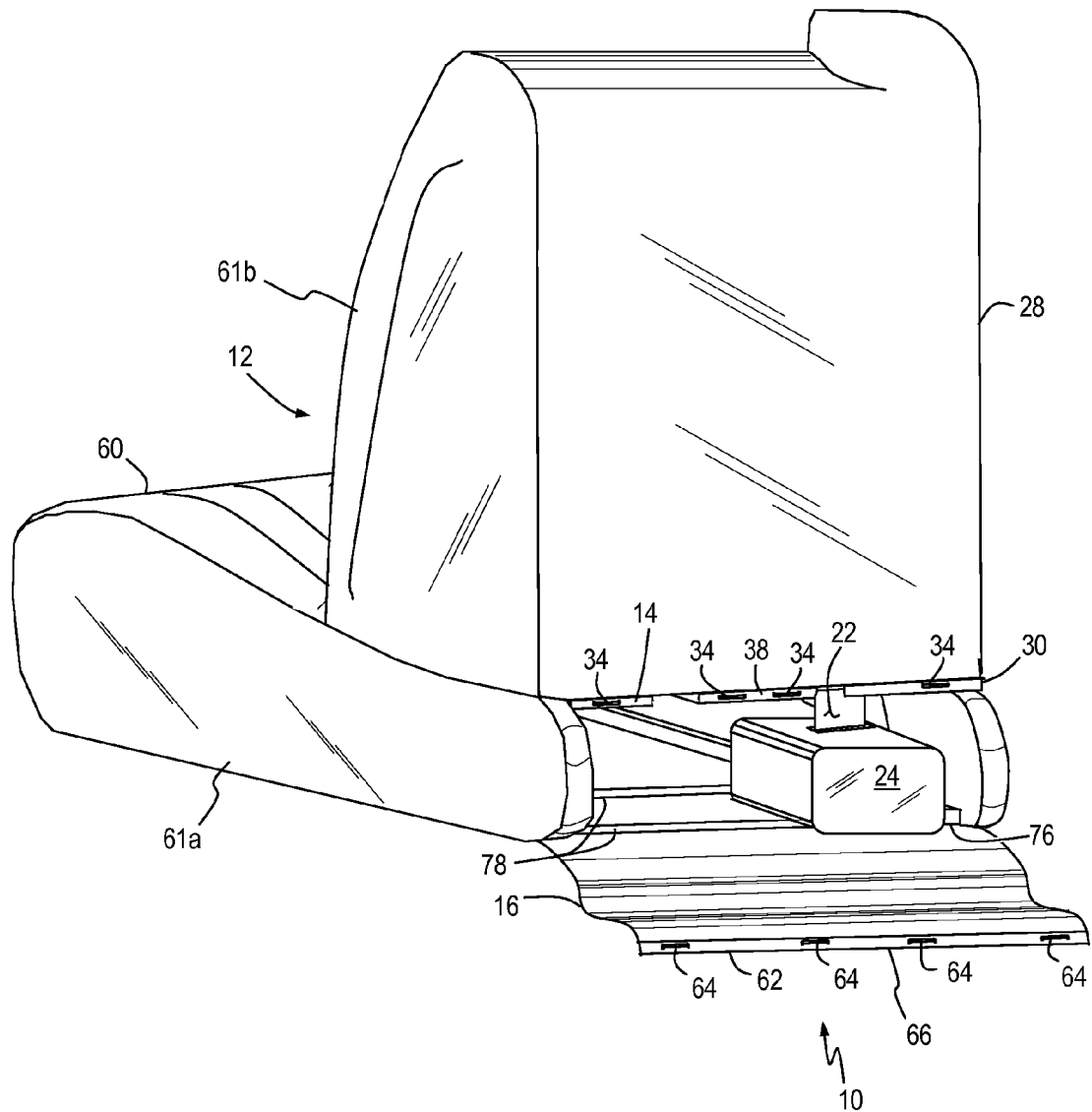
FIG. 7 is a perspective view detailing a cover portion of a seat belt webbing enclosure according to an embodiment of the present invention.

As depicted in FIGS. 1, 6 and 7, cover 16 is configured to substantially enclose the exposed portion of vehicle seat 12 between a seat cushion 60 and seat back 28 back 28 that are each separately upholstered with a covering 61a, 61b respectively. Cover 16 can have any desired shape, but is typically a generally rectangular section of material with dimensions sufficient to enclose the exposed region, having a width generally the same as the width of the seat and extending generally between seat cushion 60 and seat back 28. A fastener strip 62, having a plurality of non-detachable or detachable connectors such as J-clips 64, is attached to a first edge 66 of the cover. Cover 16 is typically made of a material similar to that used to upholster vehicle seat 12, such as leather, vinyl, and natural or synthetic fabrics, among others.

Referring now to FIGS. 1-7 in combination, seat belt enclosure 10 is assembled by locating bracket 14 over a mounted retractor 24 and orienting the bracket generally horizontally such that an aperture 40 of the bracket is positioned generally over a webbing exit 68 of the retractor. Bracket 14 is secured to seat back 28 by attaching it to a mounting bracket 70 of seat back frame 48 in any conventional manner, such as with an interference fit, fasteners, adhesives and weldments (not shown). Alternatively, bracket 14 may be formed as an integral portion of mounting bracket 70 and/or seat back frame 48. Web guide 18 is slidably inserted into a selected aperture 40 such that locking rib 54 engages coupling flange 42. Web guide 18 may be inserted by either urging it into an aperture 40 through an opening 72 or by inserting it from above or below the bracket 14. A first end of sheath 20 is slidably fitted over elongated end 56 of web guide 18 and a second end of the sheath is attached to seat belt outlet housing 26 in any conventional manner, such as with an interference fit, fasteners, adhesives and weldments (not shown). A fastener 74 is inserted through aligned tabs 32, 58 and 44 to secure together bracket 14, web guide 18 and sheath 20 respectively, as depicted in FIG. 3. Sheath 20 may optionally include mounting tabs 44 to attach the sheath to seat back frame 48 and/or a cross member 50 therein with fasteners 46, as depicted in FIGS. 1 and 3. In an alternate embodiment, the web guide 18 may be omitted and the sheath 20 attached directly to bracket 14.

The seat belt webbing 22, which is stored in retractor 24 in a coiled, biased state, is fed out of the retractor at webbing exit 68 and is routed through, in order, bracket 14, web guide 18, sheath 20 and seat belt outlet housing 26, as depicted in FIGS. 1 and 6. An end of webbing 22 exits seat belt outlet housing 26 and a tongue or buckle (not shown) is attached thereto.

A second edge 76 of cover 16, opposing first edge 66, is attached to seat 12 along the bottom of seat cushion 60 and/or a seat cushion frame 78 in any conventional manner, such as with fasteners, adhesives, VELCRO, screws, staples, stitching or sewing (not shown). Fastener strip 62 on first edge 66 of cover 16 is then positioned such that connectors 64 are proximate corresponding mating fasteners 34 and engaged thereto, as depicted in FIG. 6, to substantially enclose the exposed region between seat cushion 60 and seat back 28. In alternate embodiments a second fastener strip 62 may be attached to second edge 76 of cover 16, configured to couple to corresponding fasteners 34 attached to seat cushion 60 and/or frame 78.

In operation, seat belt enclosure 10 conceals and protects seat belt webbing 22 in the region or gap between seat cushion 60 and seat back 28 by utilizing cover 16 to deter occupants and/or objects from coming into contact with the seat belt webbing in this region. The cover 16 and its associated fasteners 34, 64 preferably have sufficient strength and durability to withstand impacts, such as that of a passenger's foot kicking the cover, and to keep such impacting objects from entering the interior of the seat cushion 60 and contacting or obstructing the exposed seat belt webbing 22. Bracket 14 provides structural support for the upholstery material covering vehicle seat 12 to aid in preventing it from contacting seat belt webbing 22, and provides a convenient mounting location for sheath 20 and cover 16. Furthermore, cover 16 and bracket 14 cooperate to enclose the portion of the seat belt webbing 22 between the retractor 24 and the bracket and aid to protect the webbing from damage or obstruction.

The present invention also provides a desirable aesthetic finished appearance to vehicle seat 12, as cover 16 encloses and covers various mechanical components of the vehicle seat contained proximate seat cushion 60, thereby shielding them from the view of vehicle occupants. Due to its attachment to the vehicle seat 12 enclosure 10 may also move with the seat and continue to provide the desirable appearance in various seat and seat back 28 positions. In addition to protecting webbing 22, enclosure 10 can also provide similar protection to other components contained proximate seat cushion 60 such as motors or gears for moving the seat, and electronic components, among others.

Figure 8:
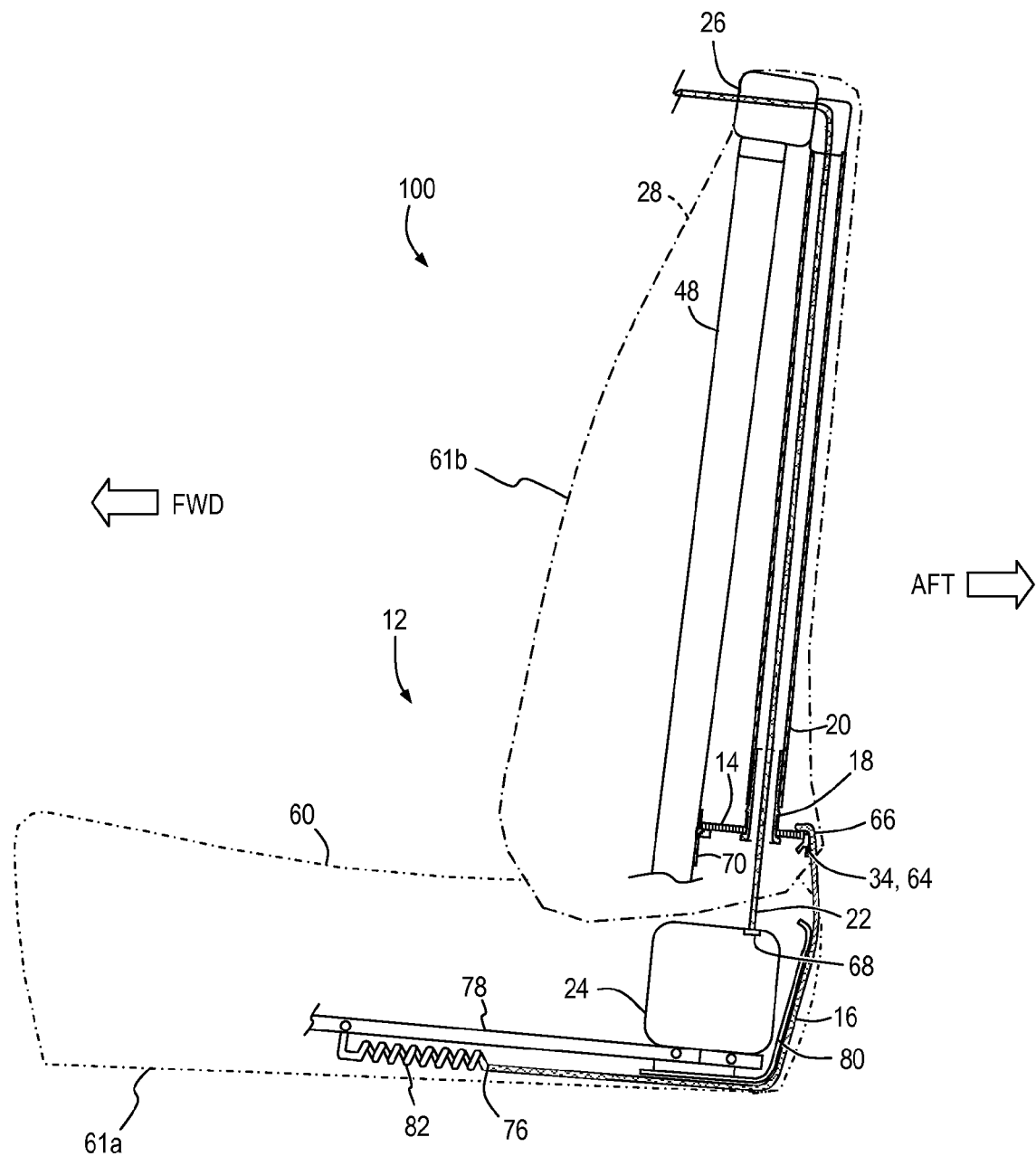
FIG. 8 is a cutaway view of a seat belt webbing enclosure installed within a vehicle seat according to another embodiment of the present invention.
Figure 9:
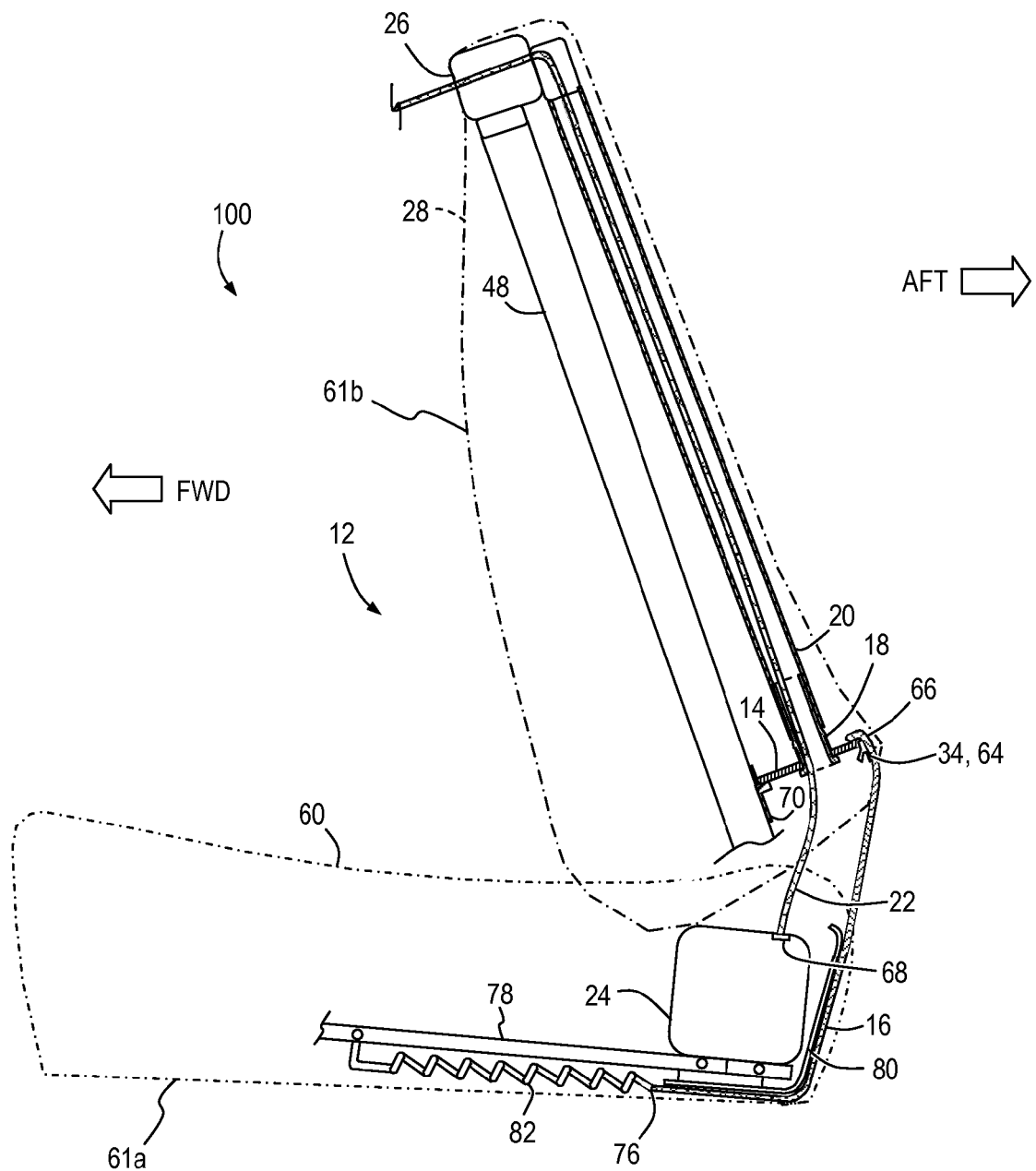
FIG. 9 is a cutaway view of the seat belt webbing enclosure of FIG. 8, showing a seat back of a vehicle seat in a forwardly-inclined position.
Figure 10:
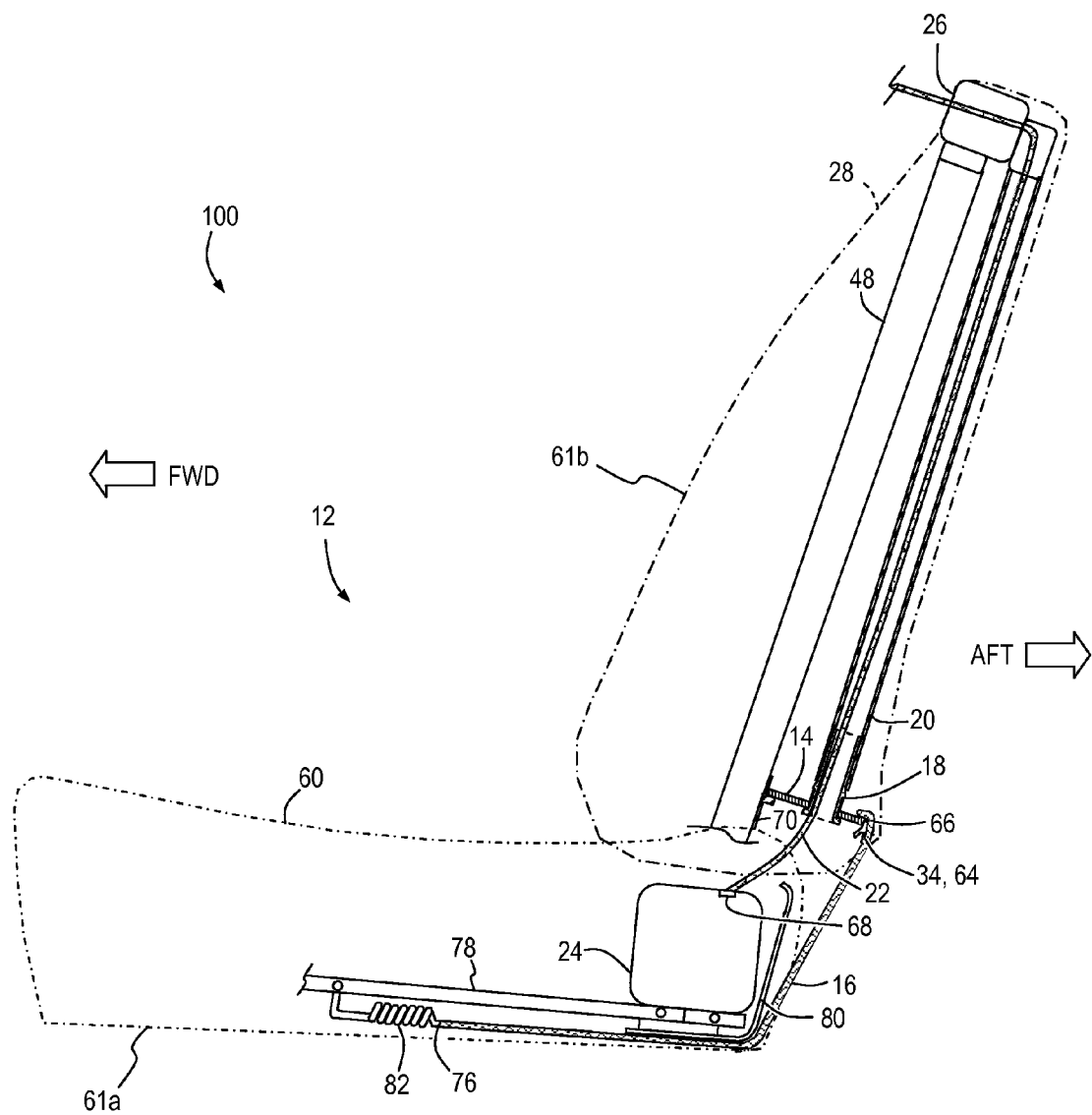
FIG. 10 is a cutaway view of the seat belt webbing enclosure of FIG. 8, showing a seat back of a vehicle seat in a reclined position.

The general arrangement of a seat belt webbing enclosure 100 for a vehicle seat 12 is shown in FIGS. 8, 9 and 10 according to another embodiment of the present invention. In addition to the elements discussed above for enclosure 10, enclosure 100 further comprises a slide member 80 that is attached to seat 12 in any conventional manner. For example, slide member 80 may be attached to, or formed as, a component of seat cushion frame 78. Slide member 80 comprises a first generally planar portion coupled to a second planar portion by a radiused bend and is oriented to extend generally between bracket 14 and seat frame 78. Slide member 80 may be made from any suitable material such as, without limitation, metals such as steel and aluminum, plastics, and composites. Slide member 80 may be fabricated using any conventional process such as, without limitation, molding, stamping, casting and machining. Slide member 80 may be finished by such processes as painting, plating and coating, or left unfinished. The size and shape of slide member 80 is not critical and may be varied to suit a particular configuration of seat 12.

First edge 66 of cover 16 is attached to seat 12 in the manner previously discussed. Cover 16 extends generally downwardly, slidably contacting and generally conforming to slide member 80. Second edge 76 of cover 16 is attached to at least one biasing element 82, such as a spring, which in turn extends between the second edge and an anchor, such as frame 78. The structure and function of the elements comprising enclosure 100 are otherwise like that previously discussed for enclosure 10, and thus will not be reiterated here.

In operation, seat belt enclosure 100 conceals and protects seat belt webbing 22 in the region or gap between seat cushion 60 and seat back 28 by utilizing cover 16 to deter occupants and/or objects from coming into contact with the seat belt webbing in this region. If seat back 28 is pivoted forwardly, as shown in FIG. 9, first edge 66 of protective cover 16 is drawn away from seat cushion 60. Protective cover 16 overcomes the bias of biasing member 82 and moves slidably upward over slide member 80, thus permitting the protective cover to continuously enclose the gap between seat cushion 60 and seat back 28. Conversely, when seat back 28 is placed in a generally upright position as shown in FIG. 8, biasing element 82 draws second edge 76 of protective cover 16 downward, keeping the gap between the seat back and seat cushion 60 covered. Likewise, if seat back 28 is pivoted aft to a reclined position as shown in FIG. 10, biasing element 82 draws protective cover 16 further downward, thus keeping the gap between the seat back and seat cushion 60 covered.

In alternate embodiments of the present invention cover 16 may be reinforced with a backing layer or by adding reinforcing members to an interior surface, (i.e., the surface facing seat cushion 60) or within the material. Such reinforcement may allow cover 16 to retain a desired shape and/or may increase the resistance of the material to bending inwardly into seat cushion 60. In other embodiments cover 16 may be made from a rigid material such as plastic or metal to provide greater protection against entry of objects into seat cushion 60. In such embodiments the rigid cover 16 may be covered with a decorative material or fabric to enhance the aesthetic appearance of seat 12. Further, cover 16 may be hingedly attached to seat cushion 60 in any conventional manner and detachably secured to seat back 28, or vice versa.

While this invention has been shown and described with respect to a detailed embodiment thereof, it will be understood by those skilled in the art that changes in form and detail thereof may be made without departing from the scope of the claims of the invention.

What is claimed is:

1. A vehicle seat, having a seat belt webbing enclosure, comprising:
   a covered seat cushion;
   a separately covered seat back proximate the seat cushion, the seat cushion and seat back defining an uncovered region of the seat;
   a bracket attached to a frame of the seat back;
   a seat web guide coupled to the bracket;
   a sheath directly attached to the seat web guide and the seat web guide directly coupled to the bracket, the sheath extending upwardly to an outlet housing attached to a seat back frame, a seat belt web extending through the bracket and the sheath to exit the outlet housing; and
   a protective cover directly attached to the bracket and extending downwardly to the seat cushion to generally close off the uncovered region.

2. The vehicle seat of claim 1 wherein a first end of the protective cover is detachably coupled to the bracket.

3. The vehicle seat of claim 1 wherein a second end of the protective cover is detachably coupled to the seat cushion.

4. The vehicle seat of claim 1 wherein a second end of the protective cover is fixedly attached to the seat cushion.

5. The vehicle seat of claim 1 wherein the protective cover is made from at least one of leather, vinyl, natural fabric, synthetic fabric, plastic and metal.

6. The vehicle seat of claim 1 wherein the bracket is made from at least one of metal, plastic, and composite materials.

7. A method for enclosing a seat belt webbing of a vehicle seat, comprising the steps of:
   obtaining a covered seat cushion;
   locating a separately covered seat back proximate the seat cushion, the seat cushion and seat back defining an uncovered region of the seat;
   attaching a bracket to a frame of the seat back; providing a sheath directly attached to a seat web guide and the seat web guide directly coupled to the bracket, the sheath extending upwardly to an outlet housing attached to a seat back frame, a seat belt web extending through the bracket and the sheath to exit the outlet housing; and
   directly attaching a protective cover to the bracket such that the protective cover extends downwardly to the seat cushion to generally close off the uncovered region.

8. The method of claim 7, further comprising the steps of coupling the sheath to the bracket and extending the sheath upwardly to the outlet housing attached to the frame of the seat back, the seat belt web extending through the bracket and the sheath to exit the outlet housing.

9. The method of claim 7, further comprising the step of installing the seat web guide intermediate the bracket and the sheath.

* * * * *